Aug. 8, 1933.  E. E. CULLEN  1,921,348
DISH
Filed Aug. 25, 1931
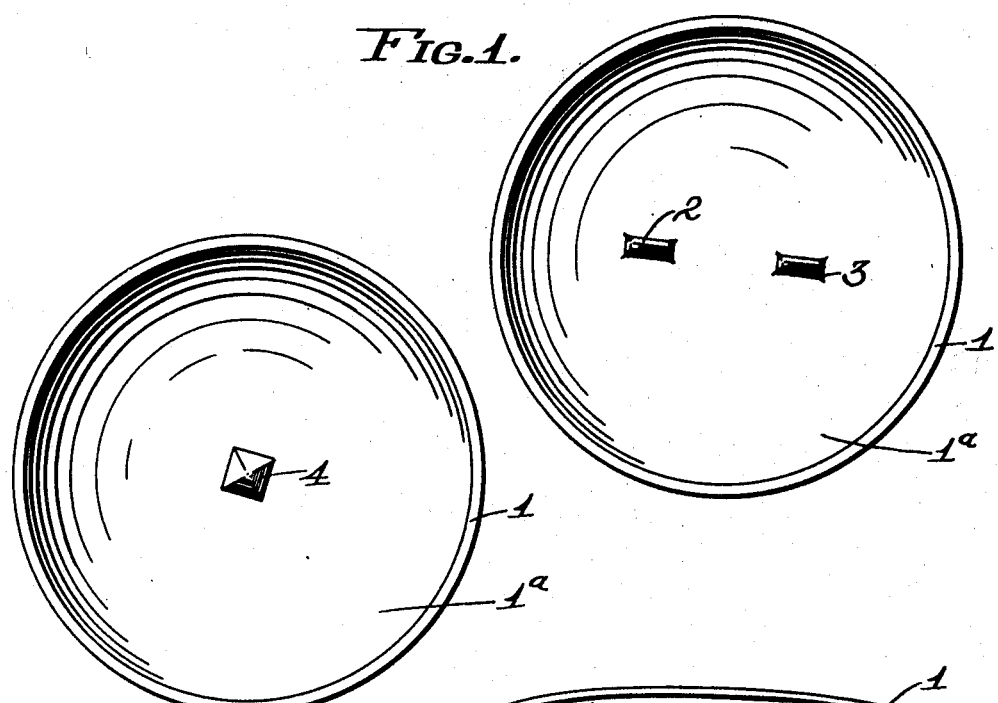
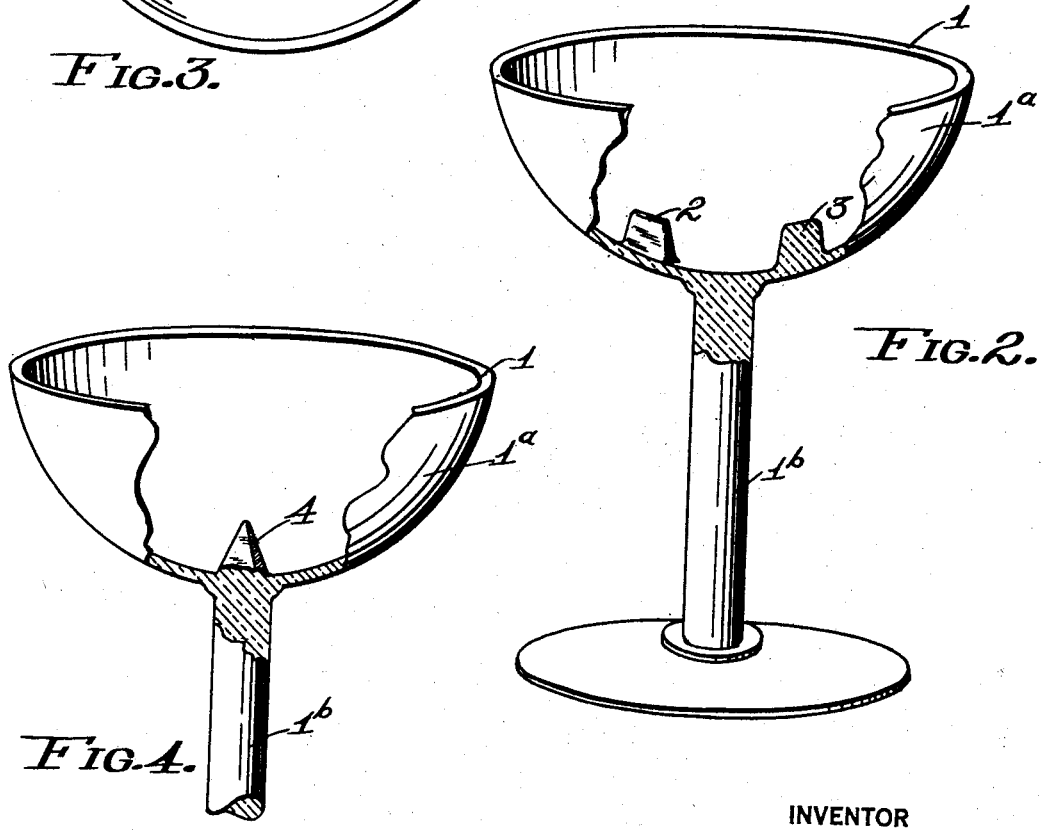
INVENTOR
ERNEST E. CULLEN
BY
A. B. Bowman
ATTORNEY Patented Aug. 8, 1933

1,921,348

UNITED STATES PATENT OFFICE 1,921,348

DISH

Ernest E. Cullen, San Diego, Calif.

Application August 25, 1931. Serial No. 559,161

2 Claims. (Cl. 65—15)

My invention relates to dishes, more particularly to individual food dishes, and specifically to dishes from which solid foods are eaten, such as sundae cups, dessert dishes and the like, and the objects of my invention are:

First, to provide a dish, cup, bowl or other receptacle for receiving food and which is provided therein with means adapted to project into the food for preventing the food from shifting, turning, rolling around, or otherwise moving in the dish or other receptacle when eating the food.

Second, to provide a dish, cup, bowl or other receptacle of this class having lugs or spurs extending upwardly from the bottom thereof, and over which certain kinds of foods may be placed or forced when placing the food into the dish in such a manner that the lugs or spurs will project into the food to prevent the same from being moved readily about the dish.

Third, to provide a receptacle of this class in which the lugs or spurs are shaped and spaced relatively so as to provide an arrangement for preventing the food from rotating readily in the dish or other receptacle.

Fourth, to provide a receptacle of this class which may be readily kept sanitary.

Fifth, to provide a receptacle of this class in which all of the contents of the receptacle may be easily removed; and Sixth, to provide a receptacle of this class which is very simple and economical of construction, which ordinarily requires no more complicated equipment than is necessary in the manufacture of ordinary dishes, and a receptacle of this class which will not readily deteriorate.

With these and other objects in view as will appear hereinafter, my invention consists of certain novel features of construction, combination and arrangement of parts and portions, as will be hereinafter described in detail and particularly set forth in the appended claims, reference being had to the accompanying drawing and to the characters of reference thereon which form a part of this application in which:

Figure 1 is a top view of a dish or receptacle incorporating my invention in its preferrred form; Fig. 2 is a perspective view thereof taken from one side showing portions thereof broken away and in section to facilitate the illustration; Fig. 3 is a top view of a dish or receptacle incorporating my invention in a slightly modified form; and Fig. 4 is a perspective view taken from one side showing portions thereof broken away and in section to facilitate the illustration and to simplify the drawing.

Like characters of reference refer to similar parts and portions throughout the views of the drawing.

The receptacle or dish shown in the preferred form in Figs. 1 and 2, consists of a common type of sundae cup, comprising a cup portion or bowl 1a supported in this instance on a pedestal 1b. In the bottom portion of the bowl there is provided spaced upwardly extending lugs 2 and 3 which are in the form of upwardly directed, tapered, wedge-shaped spurs, more specifically these spurs are relatively long, narrow, upwardly diminishing, wedge-shaped lugs. These lugs are made integrally with the bowl when cast with the bowl. It will be noted that these lugs may also be made a part of and pressed out as a part of a bowl when the latter is made of sheet metal, waxed paper, or other sheet material, or when formed or pressed from such materials as wood pulp or other plastic substances.

The food is merely placed into the dish over the lugs and pressed slightly thereover so that the lugs project into the food, thus when the dish is served as a sundae cup the ice cream is placed into the dish by the scoop and forced slightly over the lugs. These lugs prevent the ice cream from moving about in the dish when eating with a spoon or other utensil.

In the modified form as shown in Figs. 3 and 4, there is a single lug 4 in the central portion of the bottom of the bowl which is in the form of an upwardly directed tapered spur pointed at its upper end. More specifically, this lug is in the form of a pyramid or substantially in the form of a pyramid having a small number of sides such as three or four and may be made integrally with the stem or pedestal when the bowl is fabricated separately from the stem, or may be made integrally with the bowl.

Though I have shown and described a particular construction, combination and arrangement of parts and portions and certain modifications thereof, I do not wish to be limited to this particular construction, combination and arrangement of parts and portions, nor to the modification disclosed, but desire to include in the scope of my invention, the construction, combination and arrangement, irrespective of the types of receptacle or the number or shape of lugs, spurs or projections, substantially as set forth in the appended claims.

Having thus described my invention, what I claim as new and desire to secure by Letters Patent is:

1. A bowl-shaped receptacle having a plurality of fixed integral upwardly directed elongated wedge-shaped spurs surrounding the middle portion of its bottom, said spurs positioned with their longitudinal axes substantially parallel with the axis of said receptacle.

2. A dish consisting of a bowl-shaped receptacle having a pair only of fixed integral upwardly directed elongated wedge-shaped spurs with their longitudinal axes extending substantially parallel with the axis of said receptacle.

ERNEST E. CULLEN.